Sept. 13, 1966  R. W. SMITH  3,271,844
METHOD OF MAKING HEAT SENSOR UNIT
Filed July 15, 1963
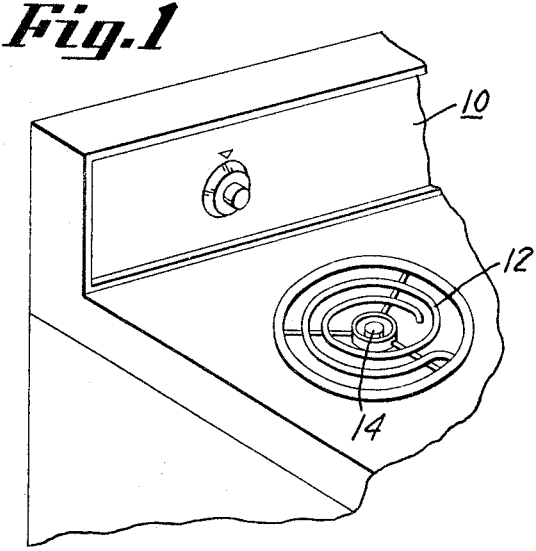
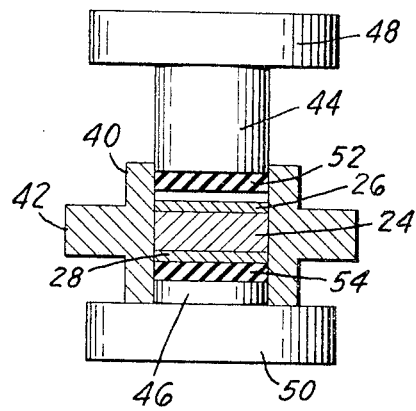
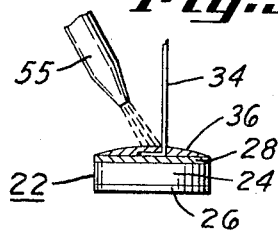
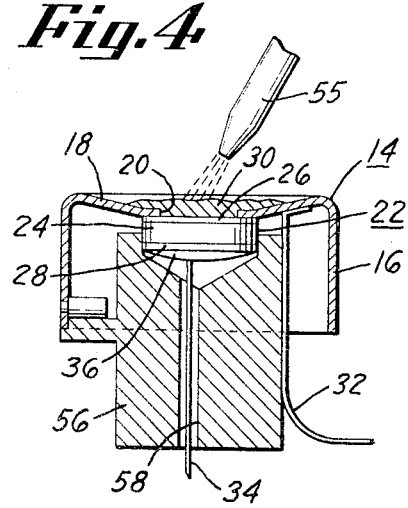
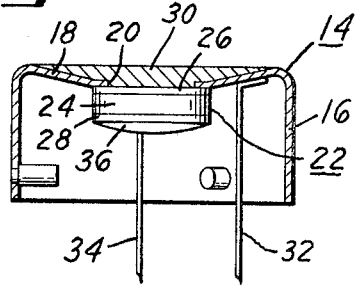
INVENTOR.
ROBERT W. SMITH
BY
J.C. Evans
ATTORNEY United States Patent Office 3,271,844
Patented Sept. 13, 1966

3,271,844
METHOD OF MAKING HEAT SENSOR UNIT
Robert W. Smith, Flint, Mich., assignor to General Motors Corporation, Detroit, Mich., a corporation of Delaware
Filed July 15, 1963, Ser. No. 295,145
3 Claims. (Cl. 29—155.63)

This invention relates to temperature sensing assemblies and more particularly to an improved thermistor assembly for sensing the temperature of an object in heat transfer relationship therewith and an improved method of manufacturing such assemblies.

One problem in thermistor assemblies for sensing temperature has been that of mounting the thermistor element on a support so as to provide a mechanically strong interconnection therebetween without employing a method of assembly using conventional brazing and welding techniques which produce undesirably high temperatures and stresses in the thermistor during the assembly thereof that affect the responsiveness of the completed assembly.

Accordingly, an object of the present invention is to provide an improved thermistor assembly including the provision of means for making the assembly mechanically strong, heat and oxidation resistant and ohmically stable.

A further object of the invention is to improve thermistor assemblies by the provision of a metallic layer for fastening a thermistor element to a supporting element wherein the metallic layer serves as the primary heat conducting path between the thermistor element and an object whose temperature is being sensed by the element.

A still further object of the present invention is to improve a thermistor mounting arrangement having a pellet of thermistor material with the ends thereof covered by heat resistant, electrical contacts by connecting one of the electrical contacts to a supporting element by means of a first layer of spray metalized material and connecting the other contact to an electrical conductor by means of a second layer of spray metalized material.

A further object of the invention is to provide an improved method for manufacturing thermistor mounting assemblies which eliminates brazing and welding assembly techniques and the attendant problems of high temperatures and stresses.

A further object of the invention is to provide an improved method of manufacturing thermistor mounting assemblies comprising the steps of roughening electrical contact surfaces on either end of a thermistor element, connecting an electrical conductor by placing the conductor in contact with one of the contact surfaces and overspraying both the conductor and the contact surface with a suitable coating of metal, and attaching the thermistor element to a mounting plate or receptacle by placing the thermistor element in position on the mounting plate and overspraying the junction of the thermistor element and the mounting plate with a suitable layer of metal.

Further objects and advantages of the present invention will be apparent from the following description, reference being had to the accompanying drawings wherein a preferred embodiment of the present invention is clearly shown.

In the drawings:

FIGURE 1 is a view in perspective of an electrical range including the present invention;

FIGURE 2 is a view partly in cross section of a mold for forming a thermistor having electrical contacts with rough surfaces for receiving a spray metalized coating in accordance with one of the steps of the invention;

FIGURE 3 is a view partly in elevation and partly in section of a thermistor element being joined to an electrical lead according to the invention;

FIGURE 4 is a view partly in section and partly in elevation showing the thermistor element being joined to a supporting element according to the invention; and FIGURE 5 is a view partly in section and partly in elevation of the thermistor mounting arrangement of the present invention.

Referring now to FIGURE 1, an electrical range 10 is shown including a surface heating element 12 such as a coiled Nichrome resistance element having a thermistor sensing assembly 14 constructed in accordance with certain of the principles of the present invention located within a central opening formed by the surface heating element 12. The thermistor mounting arrangement is adapted to be biased upwardly of the surface heater 12 into intimate heat transfer relationship with a utensil supported by the heater 12 for heating thereby. A thermistor element in the thermistor mounting arrangement 14 will accordingly sense the temperature of the utensil and the resistance of the thermistor element will vary to condition an electrical control circuit for varying the energization of the surface heater 12. Typical means for biasing the thermistor mounting arrangement into contact with the utensil and means for controlling the surface heating element are set forth in the Long Patent 2,882,379, issued April 14, 1959, with it being understood that the thermistor mounting arrangement of the present invention is suited for use in other control systems where it is desired to sense the temperature of an object for conditioning the control system to vary the energization of a device being regulated by the control system.

In FIGURE 5, the improved thermistor mounting arrangement is illustrated as comprising an inverted cup-shaped 16 having the bottom 18 thereof slightly convexly shaped toward the inside of the cup 16 and including an opening 20 directed centrally through the bottom 18. Within the inverted cup element 16 a generally cylindrically shaped thermistor element 22 is located comprising a layer 24 of thermistor material having an electrical coefficient of resistance that varies with changes in temperature and layers 26, 28 of electrically conductive material, preferably cermet, covering planar surfaces on the ends of the layer 24 to serve as electrical contacts for a source of potential across the layer 24 of thermistor material.

The contact layer 26 engages the inner surface of the bottom 18 so as to be concentrically aligned with the opening 20 therein and is bonded to a layer of spray metalized material 30, such as nickel, that fills the opening 20 and the convexly-shaped bottom 18 to form a plane surface thereacross extending to the outer periphery of the cup 16. The layer 30 of flame sprayed material produces a mechanically strong positive electrical connection between the cap 16 and the thermistor element 22 to assure an ohmically stable sensing assembly and the fact that the layer 30 forms a plane surface having a substantial cross-sectional area assures that the thermistor element 22 will be in good heat transfer relationship with an object whose temperature is being sensed thereby. A further feature of the invention is that the layer 30 of spray metalized material prevents penetration of any foreign matter across the interface between the cup 16 and the contact layer 26. Hence the supported thermistor element will remain in good electrical contact with the cup 16 which may serve as a portion of the conductive path that connects the thermistor in circuit with the other portions of an electrical control system.

In order to electrically connect the thermistor element 22 in circuit with a control system a first strip 32 of electrically conductive material is spot welded to the inside surface of the bottom 18 and a second strip 34 of electrically conductive material is secured to the layer of conductive material 28 by means of a layer 36 of spray metalized material that covers one end of the conductive strip 34 and the surface of the contact layer 28. Accordingly, an electrical path is provided through conductor 32, the cup-shaped support 16, the contact layer 26, the thermistor layer 24, the contact layer 28 and the conductor 34 with the above-described circuit having a variable resistance according to the temperature of the thermistor layer 24.

A further advantage of the above-described thermistor element is that it is very resistant to oxidation and high temperatures because the elements thereof are effectively bonded into a unitary sensor of high temperature materials that is shielded by the cup-shaped support 16 against sources of heat except for the object in heat transfer contact with the upper surface of the layer of material 30.

Referring now to FIGURES 2 through 4, an improved method for manufacturing thermistor sensing assemblies is illustrated as basically including the steps of connecting a thermistor element to a mounting element such as a bracket, heat sink, receptacle, thermal board, or the like, by means that avoid high temperatures and stresses on the thermistor element normally associated with brazing and welding techniques with the final assembly being mechanically strong, heat and oxidation resistant and able to provide good thermal contact between the thermistor element and an article whose temperature is being sensed thereby. In order to carry out these objectives the pellet-like thermistor element 22 is formed by first placing conductive material, for example, a cermet material having the composition of $B_2O_3$ (2%), Pyrex glass (18%), nickel powder (80%) and Drytex (3%) in a cavity of a cylindrical die member 40 to form the contact layer 28. The die member 40 is carried on a fixed platen 42 of a hydraulic press or the like which includes opposed plungers 44, 46 directed into openings on either end of the cylindrical member 40 to be reciprocated relative thereto by means of movable press platens 48, 50. When the layer 28 of cermet powder is placed in the cylinder 40 the punch 44 is inserted within the cylinder 40 to apply a light pressure against the layer 28 and the plunger 44 is then removed and the layer 24 of thermistor material comprising $B_2O_3$ (9%), Pyrex glass (16%), blue ground coat (12%), talc (8%), magnetite (55%) and Sterotex (3%), which is merely a representative material that will have a desired variable electrical resistance characteristic in the finally assembled thermistor assembly 14, is placed in the cylinder cavity and the plunger 44 is again inserted within the cylinder 40 to lightly press this layer of material. Lastly, the plunger 44 is removed and the second layer of cermet material 26 of the above-described composition or the like is placed in the cylinder cavity and the plungers 44, 46 are both inserted within the cylinder 40 under a pressure in the range of 12,500 p.s.i. to compact the layers of material 24, 26, 28 into a bonded relationship.

One feature of the pelletizing of the thermistor unit is that the plungers 44, 46 include rubber tips 52, 54 that yield to a greater or lesser degree upon contacting the layers of cermet material 26, 28 because of the different types of material therein to produce uniform compacting of the layers and a surface roughness on the generally planar surfaces of each of the cermet layers 26, 28 that is especially suited for receiving spray metalized material in bonded relationship therewith.

Following pressing of the pellet-like thermistor element 22, the thermistor element 22 is fired in a conventional manner to produce a desired bonding of the particles therein corresponding to a desired electrical resistance characteristic. In the illustrated method the thermistor element is fired at 1600° F. in a nitrogen atmosphere for approximately 20 minutes and cooled for approximately the same length of time with it being understood that the temperatures, heating time and cooling time will be varied depending upon the desired resistance characteristic of the thermistor element.

Following sintering of the thermistor element the edges of th pellet are shielded by suitable means and a bent end portion of the conductor strip 34 is held against the cermet contact 28 as best illustrated in FIGURE 3 and a metal spray gun 55 or the like is used to flame spray a layer of suitable material such as nickel on the junction between the conductor 34 and the cermet contact 28 to form a mechanically strong union therebetween having good electrical conductivity properties.

The final assembly of the thermistor mounting arrangement involves setting the thermistor element 22 on a small pedestal 56 which contains a hole 58 for receiving the conductor strip 34. The inverted cup-shaped support 16 is then placed bottom side up over the thermistor element and the opening 20 therein is located in concentric alignment with the cermet contact 26 so that the layer 26 will be in engagement with the inside surface of the bottom 18 around the opening 20. A spray gun is then used to flame spray a suitable metal to fill the opening 20 and the recessed surface of the bottom 18 to form a flat planar surface across the top of the sensing cap 16 to the outer edge thereof with the layer of material 30 forming a mechanically strong union between the thermistor element and the cup 16 which is impervious to penetration of foreign matter into the interface therebetween. In cases where a highly responsive sensing assembly is desired a flash coat of spray metalized material is placed on either end of the thermistor element 22 prior to connecting the conductor strip 34 and cup support 16 thereto to assure that all portions of the elements will be in electrical contact with one another.

Following the bonding of the cup 16 to the thermistor element, the flame sprayed layer of material is polished smooth and clean by suitable means such as a fine sanding belt machine.

While the embodiment of the present invention as herein disclosed constitutes a preferred form, it is to be understood that other forms might be adopted.

What is claimed is as follows:

1. In a method for manufacturing sensor units comprising the steps of forming a cylindrical three-layer thermistor element including electrically conductive layers of material on either end thereof, forming a support element having a dished portion with a central opening therein, firing the thermistor unit to integrally bond the conductive layers with a layer of thermistor material disposed intermediate thereof, locating the end of one of the conductive layers in engagement with the thermistor support element around the opening therein, spray metalizing a layer of material in said support element opening to join the one conductive layer and the supporting element with a mechanically strong connection therebetween, and filling the central opening in the support element and the dished portion by spray metallizing to form a substantially planar surface on the support element throughout the extent of the dished portion with the planar surface being adapted to be located in direct heat transfer relationship with an object whose temperature is to be sensed by the thermistor element.

2. In a method for manufacturing sensor units the steps comprising, forming a thermistor element, forming a support element having a dished surface with a central opening therethrough, locating a portion of said thermistor element in engagement with the thermistor support element around the opening therethrough, spray metalizing the juncture between the support element and the thermistor element, and filling the support element opening and the dished surface by spray metalizing to form a substantially planar surface on the dished surface adapted to be located in direct heat transfer contact with an object whose temperature is to be sensed by the thermistor element.

3. In a method for manufacturing surface sensor units the steps comprising, forming a thermistor element by sequentially placing a layer of conductive material, a layer of thermistor material, and a second layer of conductive material in a hollow die, directing rubber faced contacting surfaces against the conductive layers to compress the conductive layers and the intermediate layer of thermistor material while roughening the end surfaces of the conductive layers, forming a support element having a dished surface with a central opening therethrough, locating one of the conductive layers against the thermistor element support to close the opening therethrough, spray metalizing a layer of material at the juncture between the conductive layer and the supporting element for producing a mechanically strong connection therebetween, and filling the support element opening and the dished surface by spray metalizing to form a substantially planar surface across the dished surface for transferring heat from an object in direct heat transfer contact therewith directly to the thermistor element.

References Cited by the Examiner

UNITED STATES PATENTS

| | | |
|---|---|---|
| 2,172,604 | 9/1939 | Blackburn. |
| 2,208,732 | 7/1940 | Powell _____ 29—460 |
| 2,740,031 | 3/1956 | Addink _____ 338—28 |
| 2,901,442 | 8/1959 | Huffadine _____ 29—155.71 X |
| 2,903,666 | 9/1959 | Krellner _____ 29—155.71 X |
| 3,037,179 | 5/1962 | Otto _____ 338—28 |
| 3,037,266 | 6/1962 | Pfister _____ 29—155.63 |
| 3,078,550 | 2/1963 | Rakowski _____ 29—155.63 |

JOHN F. CAMPBELL, *Primary Examiner.*

RICHARD M. WOOD, WHITMORE A. WILTZ,
*Examiners.*

H. T. POWELL, W. I. BROOKS, *Assistant Examiners.*